United States Patent [19]

Wood et al.

[11] Patent Number: 5,253,918

[45] Date of Patent: Oct. 19, 1993

[54] TRUCK BED LINER WITH INTEGRAL RAIL AND TIE-DOWN FASTENERS

[75] Inventors: Stephen R. Wood; Richard Kremer, both of Bloomingdale, Ind.

[73] Assignee: Futurex Industries, Inc., Marshall, Ind.

[21] Appl. No.: 983,945

[22] Filed: Dec. 1, 1992

[51] Int. Cl.$^5$ .............................................. B62B 33/02
[52] U.S. Cl. ...................................... 296/39.2; 264/273; 264/275; 410/106; 410/111
[58] Field of Search ............ 296/39.2; 264/259, 271.1, 264/273, 275, 279.1; 410/106, 111

[56] References Cited

U.S. PATENT DOCUMENTS

| | | | |
|---|---|---|---|
| 3,814,473 | 6/1974 | Lorenzer, Jr. | 296/39 R |
| 4,047,749 | 9/1977 | Lambitz et al. | 296/39 R |
| 4,111,481 | 9/1978 | Nix et al. | 296/39 R |
| 4,162,098 | 7/1979 | Richardson, III | 296/39 R |
| 4,253,863 | 5/1981 | Carter | 296/39 R |
| 4,279,439 | 7/1981 | Cantieri | 296/39 R |
| 4,333,678 | 6/1982 | Munoz et al. | 296/39 R |
| 4,505,508 | 3/1985 | Carter et al. | 296/39 R |
| 4,595,229 | 6/1986 | Wagner | 296/39 R |
| 4,648,765 | 3/1987 | Kovaleski et al. | 410/110 |
| 4,681,360 | 7/1987 | Peters et al. | 296/37.6 |
| 4,693,507 | 9/1987 | Dresen et al. | 296/39 R |
| 4,750,776 | 6/1988 | Barber | 296/39 R |
| 4,768,822 | 9/1988 | Gower | 296/39 R |
| 4,789,574 | 12/1988 | Selvey | 428/31 |
| 4,824,158 | 4/1989 | Peters et al. | 296/37.6 |
| 4,875,731 | 10/1989 | Ruiz | 296/37.2 |
| 4,893,862 | 1/1990 | Hollenbaugh, Sr. | 296/39.1 |
| 4,936,724 | 6/1990 | Dutton | 410/110 |
| 4,944,612 | 7/1990 | Abstetar et al. | 296/39.2 |
| 4,958,876 | 9/1990 | Dialo et al. | 296/39.2 |
| 4,986,590 | 1/1991 | Patti et al. | 296/39.2 |
| 5,007,670 | 4/1991 | Wise | 296/39.1 |
| 5,044,682 | 9/1991 | Wayne | 296/39.2 |
| 5,046,775 | 9/1991 | Marcum, Jr. | 296/39.2 |
| 5,052,737 | 10/1991 | Farmer, Jr. | 296/39.2 |
| 5,090,763 | 2/1992 | Kremer et al. | 296/39.2 |
| 5,100,193 | 3/1992 | Oprea et al. | 296/39.2 |
| 5,185,980 | 2/1993 | Rydberg et al. | 296/39.2 X |

Primary Examiner—Robert R. Song
Attorney, Agent, or Firm—Baker & Daniels

[57] ABSTRACT

Tie-down fastener formed as an integral part of a vehicle cargo liner and the process of making the same. The liner has a first liner surface, which engages the interior surface of the vehicle cargo bed when the liner is a truck bed liner, and a second liner surface opposite the first liner surface. One embodiment includes a washer or nut embedded in and substantially flush with the first liner surface of the liner for the attachment of a screw or bolt therethrough. In a second embodiment, a raised protrusion having a hole therethrough for the attachment of a tie-down thereto extends from the second liner surface and away from the first liner surface of the liner. In another embodiment, a protrusion extending from the second liner surface and away from the first liner surface of the liner is used to fasten a clip, bolt or rod which may, in turn, be used for attachment of a tie-down thereto. Also, an integral rail above the sides of the truck bed liner having a reinforcement member therein and apertures therethrough is disclosed. The tie-down fasteners of the present invention do not require separate installation from the installation of the liner, may be formed on any liner surface, are reinforced and prevent moisture from seeping through the liner to thereby damage the vehicle's cargo bed.

24 Claims, 7 Drawing Sheets

TRUCK BED LINER WITH INTEGRAL RAIL AND TIE-DOWN FASTENERS

FIELD OF THE INVENTION

This invention relates to truck bed liners, caps and covers and, in particular, to the provision of tie-down fasteners and a rail as an integral part of the liner for use in securing cargo or optional peripherals thereto.

BACKGROUND OF THE INVENTION

During recent years, pickup trucks have gained popularity as a form of family transportation as they are able to transport both passengers and cargo. If the truck is being used to carry cargo, truck bed liners are often installed to protect the metal surfaces of the truck bed from scratches and dents which may lead to rust and which affect the aesthetic appearance of the bed. Some liners, as disclosed in U.S. Pat. No. 4,162,098, protect only the floor of the truck bed; some, as disclosed in U.S. Pat. No. 4,245,863, protect only the side walls of the bed; and most protect the floor, the end wall, both side walls, and the tailgate. Various materials such as wood (U.S. Pat. No. 4,505,508), vinyl (U.S. Pat. No. 4,279,439), and plastic (U.S. Pat. No. 4,693,507), are used in the manufacture of truck bed liners, and some, such as those disclosed in U.S. Pat. Nos. 4,505,508, 4,893,862, 4,944,612 and 4,986,590, are multi-piece liners, while most have a unibody construction. The most common truck bed liner is made of a plastic material formed for a custom fit of various makes and models of pickup trucks. For example, the liner disclosed in U.S. Pat. No. 4,693,507 includes protection of the tailgate in its unitary construction, while the liners disclosed in U.S. Pat. Nos. 3,814,473, 4,047,749 and 4,111,481 and 4,958,876 use a separate liner to protect the tailgate.

The bed of the truck may also be used for the attachment of a camper top or cap in addition to carrying cargo in the open truck bed. To accommodate both uses, some liners, such as those disclosed in U.S. Pat. Nos. 4,681,360, 4,768,822 and 4,824,158, are used together with a camper top, and the truck bed liner disclosed in U.S. Pat. No. 4,875,731 is used as a bed liner or inverted and also used as a camper top.

The wide variety of truck bed liners available for a multitude of truck makes and models are able to sufficiently protect the truck bed from scratches and dents that could be created by carrying cargo in the bed, and many may be used with a camper top or cap to provide the owner with versatility in the use of the truck. However, the size and shape of the cargo may pose difficulties and transporting some items. Thus, tie-down fasteners, fasteners to which a rope, bungee cord or the like may be secured to hold oddly shaped or small items in place in the truck bed when being transported are desirable.

Many fasteners used in conjunction with truck bed liners are comprised of screws, bolts or the like. For example, chrome tie-down fasteners are screwed into the truck bed liner and in some instances assist in securing the liner to the truck. U.S. Pat. No. 4,648,765 discloses a fastener comprising a bracket and a ring wherein the bracket is screwed into the vehicle. Such tie-down fasteners must be separately installed by the consumer and often result in moisture damage of the truck bed by requiring the liner to be punctured or drilled by the consumer, and subsequent leakage or rain through the holes, where it becomes trapped between the liner and the truck bed damages the bed. It is therefore desirable to provide tie-down fasteners which do not need to be separately installed and which reduce the possibility of moisture damage to the truck. It is also desirable to provide tie-down fasteners which may be used on the sides, the front, and the floor of a truck bed liner, the lined or formed surfaces of a "topper" (camper top, cap or shell) and the lined or formed surfaces of a cargo bed cover. In their simplest form, toppers are usually attached to a vehicle cargo bed and may be comprised of a plastic form. Alternately, a topper may comprise an outer shell and an interior formed liner. A cargo cover may also be made of a formed plastic to enclose the vehicle's cargo bed. For both toppers and cargo covers, the provision of tie-down fasteners thereon provides flexibility to the consumer as to items which may be secured to the topper or cargo cover.

Many truck bed liners, whether or not they are of unitary construction, provide a rail guard which protects the top surface of the trucks side walls. For example, the truck bed liner disclosed in U.S. Pat. No. 4,333,678 includes rail guards which mount on top of the truck's side walls. Such rail guards are primarily used to protect the top of the truck's side walls and do not provide a means by which a tie-down may be fastened.

Rails extending above the truck's side walls which have holes therein for the attachment of tie-downs are currently available. Some of these rails, such as the Silver Falcon rails manufactured by D & G Products of Mt. Juliet, Tenn. and the rails disclosed in U.S. Pat. No. 4,936,724 can be used in conjunction with a unibody truck bed liner but are separate from the liner. Therefore, the consumer must install the rails in addition to the truck bed liner. Thus, it is desirable to provide rails which may be used for the attachment of tie-downs which are an integral part of a unibody truck bed liner.

A combination truck bed liner and camper top is disclosed in U.S. Pat. No. 4,875,731. In one embodiment of this invention, when the liner is in the orientation which results in a truck bed liner, rails which are an integral part of the liner extend above the top of the side walls of the truck. However, because these rails serve to attach the liner to the side walls of the truck when inverted to result in a camper top, the rails reside within the interior dimensions of the truck bed liner. Such an orientation results in stress on the side walls of the liner when tie-downs are attached to the rails. It is desirable to provide integral rails which reduce the amount of stress applied to the liner side walls and which provide additional strength to the rails in their use for attachment of tie-downs.

OBJECTS OF THE INVENTION

Accordingly, it is one object of the present invention to provide tie-down fasteners which do not require separate installation from the installation of a truck bed liner and which are less apt to result in moisture damage to the vehicle.

It is another object of the present invention to provide tie-down fasteners which may be used on the sides, the front, the top of the side wall and the floor of the truck bed liner, as well as on the lined or formed surfaces of a topper or a cargo cover.

It is another object of the present invention to provide integral rails which may be used for the attachment of tie-downs and which limit the amount of stress applied to the side walls of the truck bed liner during such use.

It is another object of the present invention to provide a bed liner with integral reinforcement members to strengthen the liner at locations where other objects may be connected to the liner.

It is still another object of the present invention to provide tie-down fasteners which may pivot, swivel and accommodate a hinge to afford flexibility in the types of fastening arrangements possible.

It is yet another object of the present invention to provide tie-down fasteners that may reside on any surface of a truck bed liner, topper (cap) or truck bed cover.

SUMMARY OF THE INVENTION

Tie-down fastener formed as an integral part of a vehicle cargo liner and the process of making the same are disclosed. The liner has a first liner surface, which engages the interior surface of the vehicle cargo bed when the liner is a truck bed liner, and a second liner surface opposite the first liner surface. One embodiment includes a washer or nut embedded in and substantially flush with the first liner surface of the liner for the attachment of a screw or bolt therethrough. In a second embodiment, a raised protrusion having a hole therethrough for the attachment of a tie-down thereto extends from the second liner surface and away from the first liner surface of the liner. In another embodiment, a protrusion extending from the second liner surface and away from the first liner surface of the liner is used to fasten a clip, bolt or rod which may, in turn, be used for attachment of a tie-down thereto. Also, an integral rail above the sides of the truck bed liner having a reinforcement member therein and apertures therethrough is disclosed. The tie-down fasteners of the present invention do not require separate installation from the installation of the liner, may be formed on any liner surface, are reinforced and prevent moisture from seeping through the liner to thereby damage the vehicle's cargo bed.

DETAILED DESCRIPTION

Figure 1:
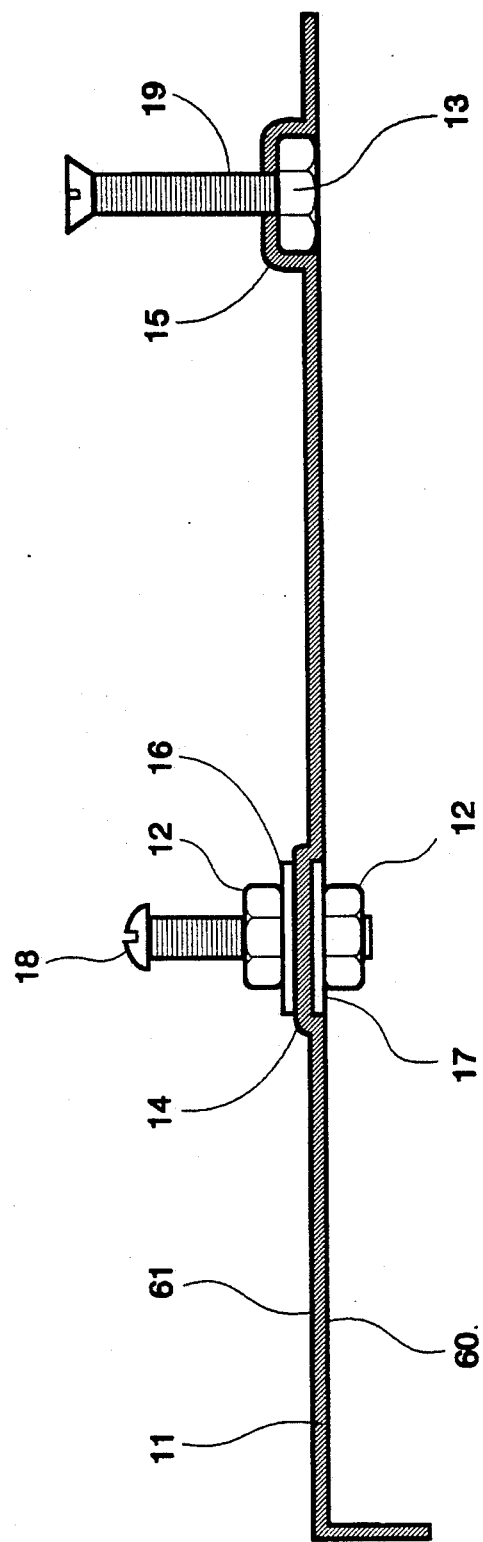
FIG. 1 shows a partial cross-sectional view of two embodiments of tie-down fasteners according to the present invention wherein a washer or a nut is formed into the truck bed liner.

Referring now to FIG. 1, there is shown a partial cross-sectional view of two embodiments of tie-down fasteners according to the present invention wherein a washer or a nut is formed into the truck bed liner. Liner 11 substantially covers one of the interior surfaces of the vehicle cargo bed (not shown) and may also cover the top surface of the vehicle's front and side walls. Examples of the interior surface of a vehicle cargo bed include the front, the sides or the bottom of a cargo bed, the rear wall of the bed which in some instances is a movable tailgate, and the top of the walls forming the enclosed cargo area. Liner 11 has first liner surface 60 which in this instance engages the interior surface of the vehicle cargo bed, and second liner surface 61 opposite first liner surface 60. In one embodiment, washer 17 is formed as a part of liner 11 and is embedded in and substantially flush with first liner surface 60. By forming washer 17 as a part of liner 11, other nuts 12 or washer 16 may be placed on either first or second liner surfaces, 60 or 61, respectively, and aligned with the hole of washer 17 for the placement of a means for fastening, or bolt 18, therethrough. It will be appreciated by those of skill in the art that washer 17 strengthens the connection by reducing the likelihood of liner 11 tearing or deforming from forces applied by screw 18 or nuts 12.

In another embodiment, nut 13 is formed as a part of liner 11 and is embedded in and substantially flush with first liner surface 60. Bolt 19 may be inserted into the hole of nut 13 for uses discussed for the first embodiment.

To form an attachment member such as washer 17 or nut 13 as an integral part of liner 11, the attachment member, washer 17 or nut 13, is placed on the mold over which liner 11 is to be formed. A sheet of formable plastic is placed over the mold, including any attachment member(s). The plastic sheet is heated and a vacuum is then applied against first liner surface 60 of liner 11 to form the plastic sheet over the mold and the attachment member(s). In this manner, one of the opposing surfaces of the attachment member is embedded in and flush with first liner surface 60.

It will be appreciated by those of skill in the art that the tie-down fasteners illustrated in FIG. 1 may be used for the attachment of a tool box, rail, or other external accessory to liner 11 on any of the liner's surfaces. The fastener may reside on any surface of liner 11 covering the vehicle's cargo bed and may be located to fulfill a specific need, such as the attachment of a particular tool box, or several such fasteners may be located in a matrix to accommodate a variety of accessories. It will also be appreciated that bolts 18 and 19 of FIG. 1 may be replaced with a bolt having an aperture therethrough for the attachment of a tie-down, such as a rope, bungee cord or the like, therethrough.

It will be further appreciated that the formation of an attachment member as in the embodiments of FIG. 1 does not result in holes in liner 11 which allow moisture to seep between second liner surface 61 and first liner surface 60 and, hence, the vehicle's cargo bed, to thereby damage the cargo bed. Of course, prior to use, a hole must be drilled through liner 11 to permit a screw or bolt to be used with the attachment member. The screw or bolt, if secure, should prevent moisture seepage. However, further precautions may be taken by using a rubber washer in conjuction with the bolt or screw. Furthermore, if the fastening means is removed from the attachment member, a rubber stopper may be placed into the hole to prevent moisture damage to the cargo bed.

Figure 2:
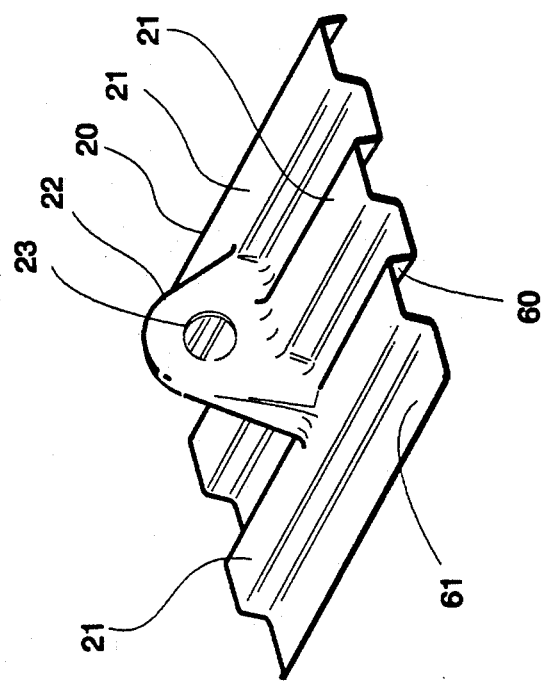
FIG. 2 shows a perspective view of a third embodiment of a tie-down fastener of the present invention wherein a protrusion having a hole therein is formed into the truck bed liner.
Figure 9:
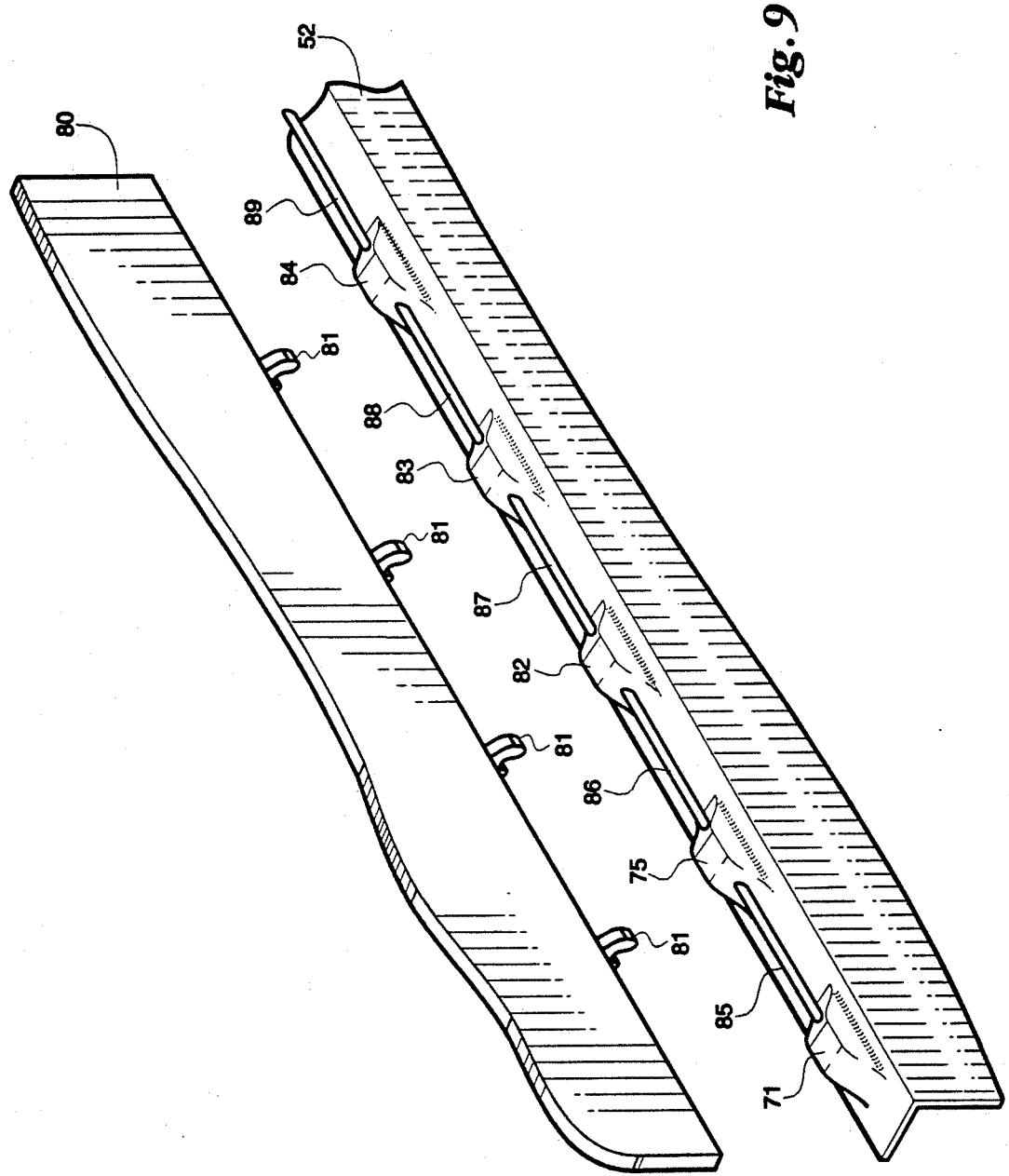
FIG. 9 shows a perspective view of a truck bed linear having a series of fasteners of the embodiment of FIG. 7 and a topper or camper top having fasteners extending therefrom for engaging the rod(s) of the fastener(s) of the truck bed liner such that the topper may be affixed to the liner.

FIG. 2 shows a perspective view of a third embodiment of a tie-down fastener of the present invention wherein a protrusion having a hole therein is formed into the truck bed liner. In this illustration, liner 20 has ridges 21 as may be found in the bottom of a truck bed liner and has two opposing surfaces, first liner surface 60, which engages the interior surface of the vehicle cargo bed, and second liner surface 61 opposite first liner surface 60. Protrusion 22 extends from second liner surface 61 and away from first liner surface 60, is of unitary construction with liner 20 and is formed to define substantially closed hole 23 adapted to receive an attachment means such as a tie-down. It will be appreciated by those skilled in the art that protrusion 22 need not form a completely enclosed hole as illustrated. There may be slot through protrusion 22, as illustrated in FIG. 9, to provide access to hole 23 thereby eliminating the need to thread a tie-down, such as a rope, through hole 23.

Figure 3:
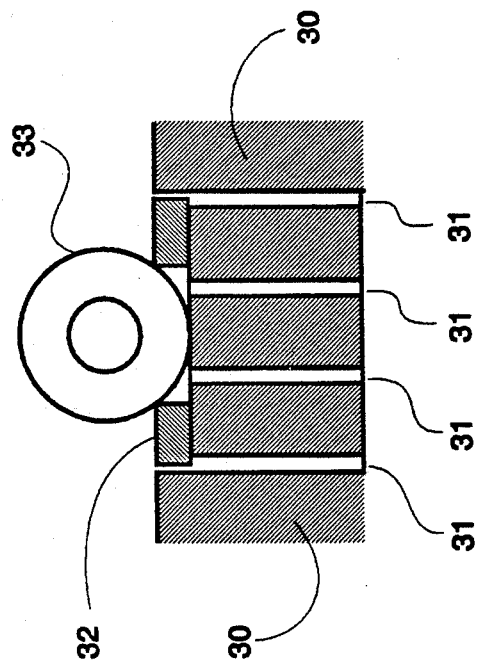
FIG. 3 shows a partial cross-sectional view of a washer inserted into a slotted support and placed on top of a mold to create the tie-down fastener embodiment of FIG. 2.

Referring to FIG. 3, there is shown a partial cross-sectional view of a washer inserted into a slotted support and placed on top of a mold to produce the tie-down fastener embodiment of FIG. 3. Mold 30 contains vacuum holes 31 which assist in forming the liner. Placed on top of mold 30 is slotted support means 32 into which reinforcement member, washer 33 is placed. In this configuration, a formable plastic sheet is placed over mold 30, support means 32 and washer 33. The sheet is heated and a vacuum is applied against the formable plastic sheet through vacuum holes 31 to form protrusion 22 as illustrated in FIG. 2. Once the liner is formed, washer 33 remains within protrusion 22 to provide reinforcement to protrusion 22. Slotted support 32 may be removed and reused to form additional protrusions in the mold. This forming process should result in the self-sealing of hole 23 of protrusion 22, even after drilling through the plastic to complete the formation of hole 23.

It will be appreciated by those of skill in the art that the protrusion is formed about washer 33 and support means 32. It will be further appreciated that various reinforcement members may be placed within support means 32 to form the protrusion and the reinforcement member may be comprised from a variety of materials. For example, the reinforcement member may be a nut, a slotted washer, or a rod having an aperture or slot therethrough, and the reinforcement member may be comprised of metal, wood, or other materials whose shape is not affected by the manufacturing process and which assists in maintaining the shape of the protrusion in the presence of stress on the protrusion.

It will be further appreciated by those of skill in the art that the embodiment of FIG. 2 is formed such that moisture is unable to pass through protrusion 22 or through hole 23 therein to first liner surface 60 where such moisture may cause damage to the vehicle's cargo bed. It will also be appreciated that reinforcement of protrusion 22 provides the capability to secure heavy items within the cargo bed and resists tearing or deformation of hole 23. Furthermore, as is true with the embodiments of FIG. 1, this embodiment of the tie-down fastener may be formed on virtually any surface of a vehicle cargo bed liner, a topper, or a cargo cover providing that surface is manufactured by the method described herein.

Figure 4:
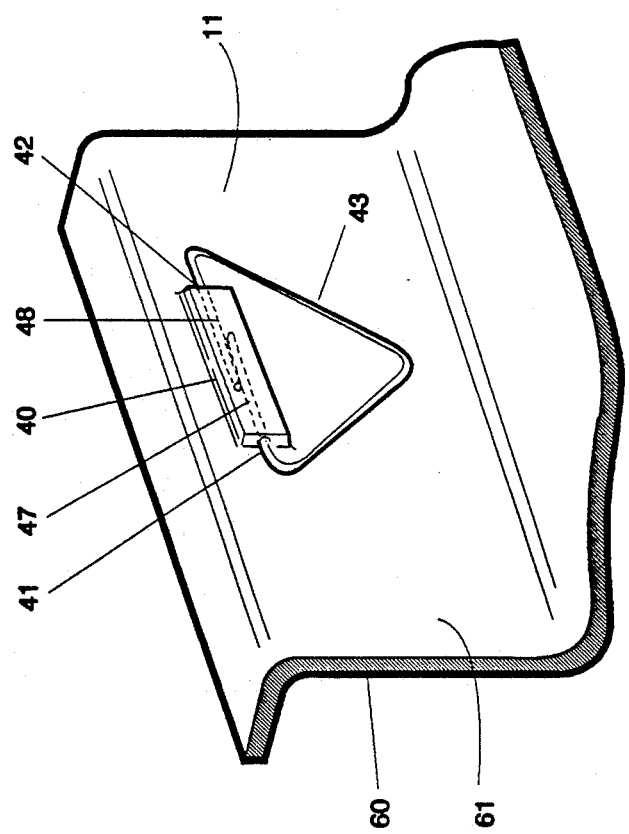
FIG. 4 shows a perspective view of a fourth embodiment of a tie-down fastener according to the present invention in which a clip is inserted into a single protrusion from the truck bed liner.

FIG. 4 shows a perspective view of a fourth embodiment of a tie-down fastener according to the present invention in which a clip is inserted into a single protrusion from the truck bed liner. Protrusion 40 is of unitary construction with liner 11 and is formed using the same process discussed for the embodiments of FIGS. 1-2. The mold may either be shaped to form protrusion 40 or a block of the shape of protrusion 40 may be placed against the mold. Protrusion 40 extends from second liner surface 61 of liner 11 and away from first liner surface 60 of liner 11. Protrusion 40 has first and second opposing holes 41, 42 therein which are drilled into protrusion 40 after the formation of protrusion 40. First and second opposing ends 47 and 48, respectively, of clip 43 are inserted into first and second opposing holes 41, 42, respectively, such that clip 43, in combination with protrusion 40, forms a substantially closed hole adapted to receive an attachment means, such as a tie-down. Clip 43 is therefore adapted to receive an attachment means or tie-down and is pivotally movable, swivels, about an axis defined by holes 41, 42.

Figure 5:
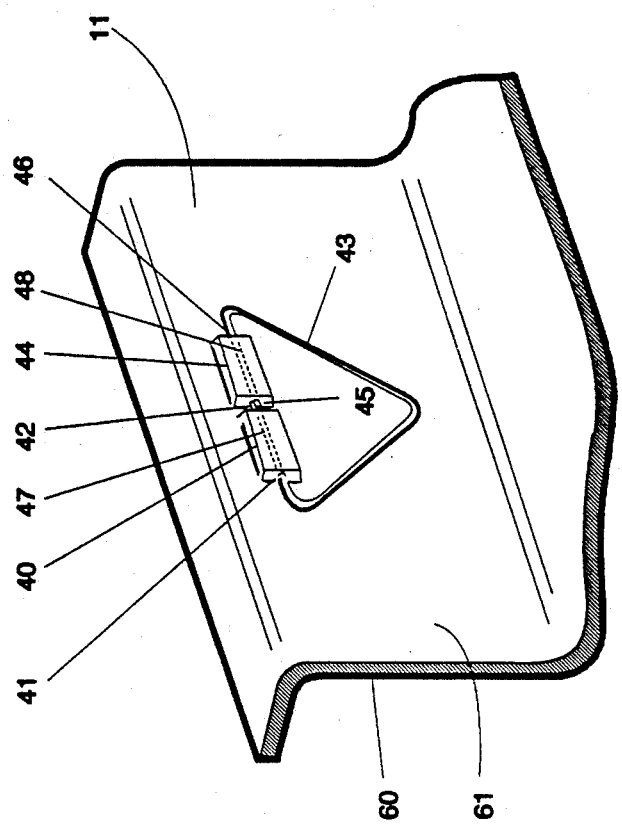
FIG. 5 shows a perspective view a of fifth embodiment of a tie-down fastener according to the present invention in which a clip is inserted into a protrusion having two portions protruding from the truck bed liner.

Referring now to FIG. 5, there is shown a perspective view a of fifth embodiment of a tie-down fastener according to the present invention in which a clip is inserted into a protrusion having two portions protruding from the truck bed liner. This embodiment is similar to that illustrated in FIG. 4. First and second protrusion portions 40, 44, formed according to the process described herein, extend from second liner surface 61 of liner 11 and away from first liner surface 60. Protrusion portions 40, 44 are of unitary construction with liner 11. First protrusion portion 40 has hole 41 therein and second protrusion portion 44 has hole 46 therein. Hole 46 of second protrusion portion 44 is substantially coaxial with hole 41 of first protrusion portion 40 such that first and second opposing ends 47, 48 of clip 43 may be inserted into holes 41 and 46, respectfully. Thus, first and second protrusion portions 40 and 44 lie substantially between first and second holes 41 and 46. Thus, clip 43, in combination with protrusion portions 40, 44, forms a substantially closed hole through which a tie-down may be fastened as clip 43 is adapted to receive an attachment means such as a tie-down. Also, clip 43 is pivotally movable about an axis defined by holes 41, 46.

It will be appreciated by those of skill in the art that until holes are drilled, no moisture problem is posed by the presence of protrusion portions 40, 44 of the embodiments of FIGS. 4-5. A rubber stop may be used with clip 43 to hold clip 43 in place and to prevent moisture seepage toward the vehicle's cargo bed. It will be further appreciated that clip 43 of the embodiments shown in FIGS. 4-5 may be comprised of metal, plastic or any other material which substantially retains its shape when a tie-down is fastened thereto.

Figure 6:
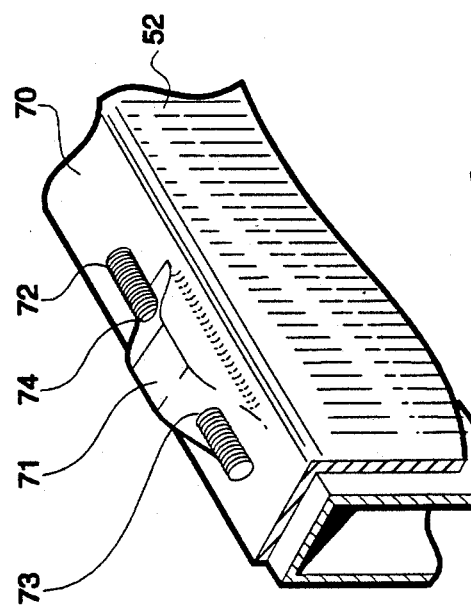
FIG. 6 shows a perspective view of a sixth embodiment of a tie-down fastener according to the present invention in which a bolt is inserted into a single protrusion from the side wall top surface of the truck bed liner.

Referring now to FIG. 6, there is shown a perspective view of another embodiment of the tie-down fastener of the present invention in which a bolt is inserted into a single protrusion from the side wall top surface of a truck bed liner. Specifically, in this embodiment, the truck bed liner includes liner side wall 52 substantially covering the vehicle's side wall, and liner side wall top surface 70 substantially covering the top surface of the vehicle's side wall. Protrusion 71, extending from and formed from liner side wall top surface 70 has bolt 72 inserted through first and second opposing holes 73, 74 of protrusion 71 which are drilled into protrusion 71 after formation of protrusion 71. From bolt 72, various fasteners such as nuts, hinges and the like may be attached.

Figure 7:
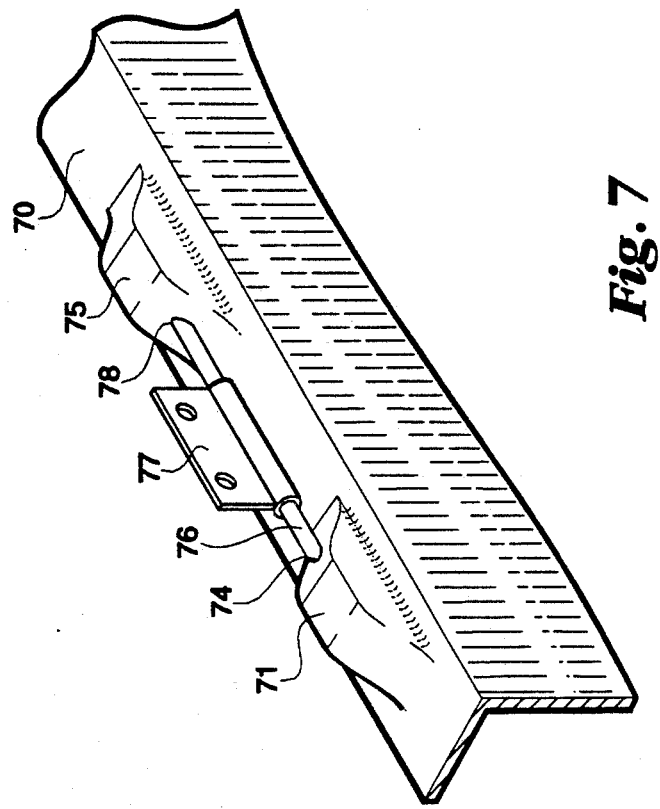
FIG. 7 shows a perspective view of a seventh embodiment of a tie-down fastener according to the present invention in which a rod is inserted into and between the two portions of a protrusion extending from the side wall top surface of the truck bed liner and where a hinge has been placed on the rod.

FIG. 7 shows a perspective view of another embodiment of the tie-down fastener of the present invention in which a rod is inserted into and between the two portions of a protrusion extending from the liner side wall top surface. Liner side wall top surface 70 has first and second protrusion portions 71 and 75, respectively, extending therefrom and of unitary construction with liner side wall top surface 70. First protrusion portion 71 has first hole 74 drilled therein which faces first hole 78 of second protrusion portion 75 such that rod 76 extends between first hole 74 of first protrusion portion 71 and first hole 78 of second protrusion portion 75 and such that rod 76 substantially extends between first and second protrusion portions 71 and 75. Fasteners, such as hinge 77 illustrated in this embodiment, may be affixed to rod 76 and used to hingedly fasten a peripheral, such as a tool box or camper top, to the truck bed liner. It will be appreciated by those of skill in the art that O-rings may be placed proximate the holes in the protrusions of the embodiments of FIGS. 6-7 to prevent moisture from seeping through the holes. Further, such O-rings finally engage the bolt or rod to the protrusion portions. Also, a nut may be formed inside the protrusion pursuant to the method described for the embodiment of FIGS. 1-3 to engage the bolt or rod to hold the bolt or rod in place.

Figure 8:
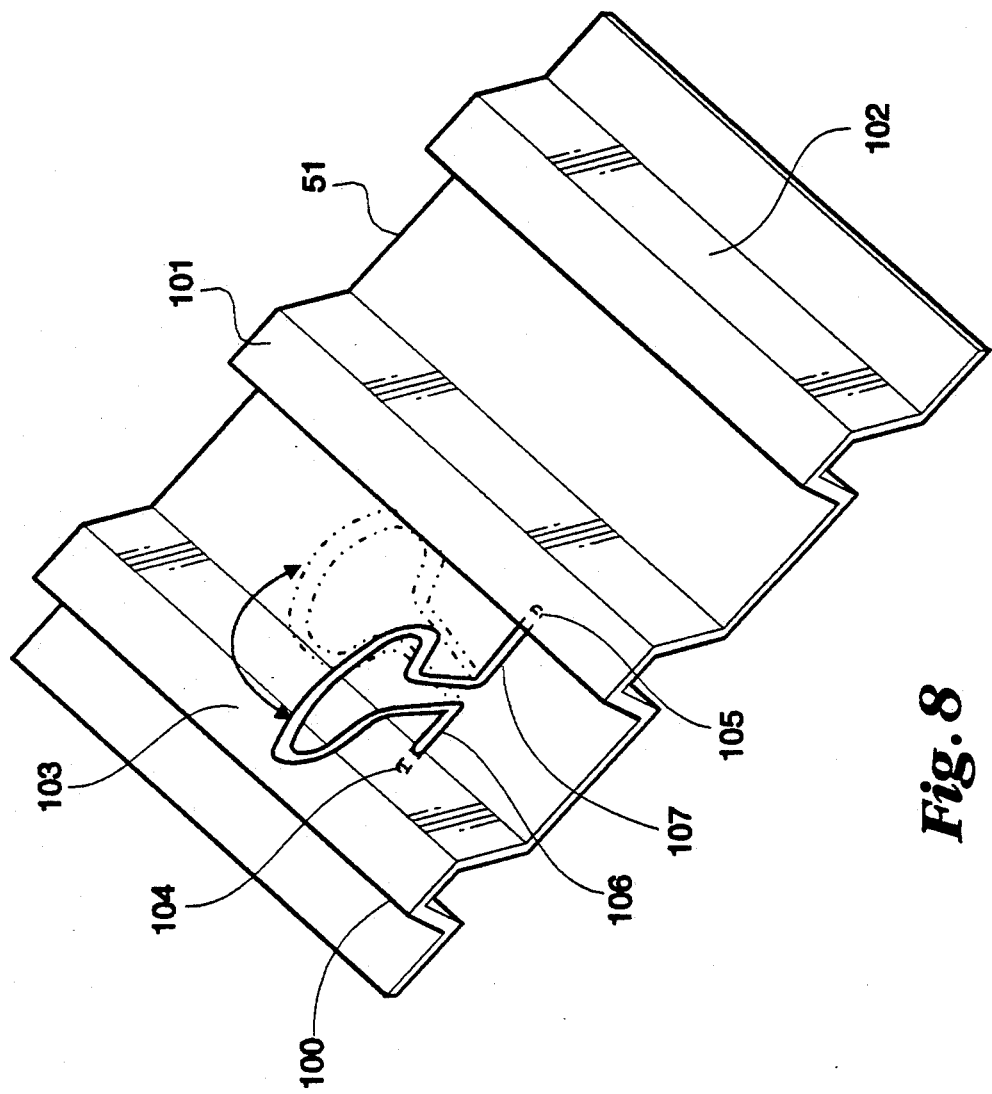
FIG. 8 shows a perspective view of an eighth embodiment of a tie-down fastener according to the present invention in which a clip is inserted into ribs protruding from the truck bed liner's floor or wall.

Referring now to FIG. 8, there is shown a perspective view of another embodiment of the tie-down fastener of the present invention in which a clip is inserted between ribs protruding from a truck bed liner floor or wall. In this embodiment, liner floor 51 comprises first, second and third ribs 100, 101 and 102, respectively. Clip 103 having first and second ends 104 and 105, respectively is inserted into first hole 106 of first rib 100 and first hole 107 of second rib 101 such that clip 103 is pivotally affixed about an axis defined by holes 106 and 107 between first and second ribs 100 and 101. Clip 103 is permitted to swivel 180°—two possible positions are illustrated in FIG. 8.

It will be appreciated by those of skill in the art that first and second ribs 100 and 101 are protrusions above liner floor 51 that are of unitary construction with liner floor 51. As was discussed for the embodiments of FIGS. 4-7, holes 106 and 107 are drilled into first and second ribs 100 and 101, respectively, after the formation of first and second ribs 100 and 101. Also, star rings or nuts may be used to prevent moisture from seeping through liner floor 51 at holes 106, 107. Also, first and second ribs 100 and 101 are akin to the first and second protrusion portions of FIGS. 5 and 7.

It will be further appreciated that the tie-down fasteners of the embodiments of FIGS. 1-8 may be formed in a truck bed liner or on a topper (camper top) or cargo cover. If the same process is utilized to form the outer and/or interior surfaces of a topper, the tie-down fasteners disclosed herein may be utilized to secure cargo or attach peripherals to the outside and/or inside surfaces of the topper. Similarly, the surfaces of a cargo cover may also include the tie-down fasteners according to the present invention.

FIG. 9 shows a perspective view of a truck bed liner having a series of fasteners of the embodiment of FIG. 7 and a topper or camper top having fasteners extending therefrom for engaging the rod(s) of the fastener(s) of the truck bed liner such that the topper may be affixed to the liner. Specifically, disposed on liner top surface 52 are first through fifth protrusions 71, 75, 82, 83 and 84, respectively. First rod 85 extends between first and second protrusions 71 and 75, respectively; second rod 86 extends between second and third protrusions 75 and 82, respectively; third rod 87 extends between third and fourth protrusions 82 and 83, respectively; and fourth rod 88 extends between fourth and fifth protrusions 83 and 84 respectively. Topper 80 has four slotted fasteners 81 extending therefrom such that slotted fasteners 81 may engage first through fourth rods 85-88 to affix topper 80 to the truck bed liner.

It will be appreciated by those of skill in the art that the provision of fasteners on both the truck bed liner and the topper permit for the easy attachment of the topper to the truck bed liner. It will also be appreciated that similar mechanisms may be utilized to attach a cargo cover to the truck bed liner. Various combinations of the fasteners of the embodiments disclosed herein may be used to accomplish the same result. Further, when no topper or cargo cover is attached to the truck bed liner, the fasteners of the truck bed liner may be utilized as a tie-down fastener for retaining cargo as well as peripherals such as tool boxes.

It will also be appreciated that first, second, third and fourth rods 85-88 of the embodiment of FIG. 9 may be replaced with a single rod providing that one protrusion. Thus, single rod 89 may extend through all protrusions 71, 75, 82, 83 and 84 extending in a substantially linear pattern over liner top surface 70 of the truck bed liner. It will also be appreciated that neighboring pairs of protrusions as labelled in FIG. 9 comprise the first and second protrusion portions as labelled in FIG. 7.

It will be still further appreciated that the tie-down fasteners disclosed herein may be placed on any surface of a truck bed liner, topper or cargo covered manufactured by the processes disclosed herein. A fastener may reside on the side, front, bottom and rail top surfaces of a truck bed liner, on the surfaces of a topper as well as on the surfaces of a cargo cover. Provisions of such fasteners provides flexibility for the types of items that may be secured within the vehicle's cargo bed or even external to the carbo bed as in the case of fasteners provided on the exterior surface of a cargo cover or the outside of a topper. Further, as shown in FIG. 9, the fasteners may be fastened to each other.

Figure 10:
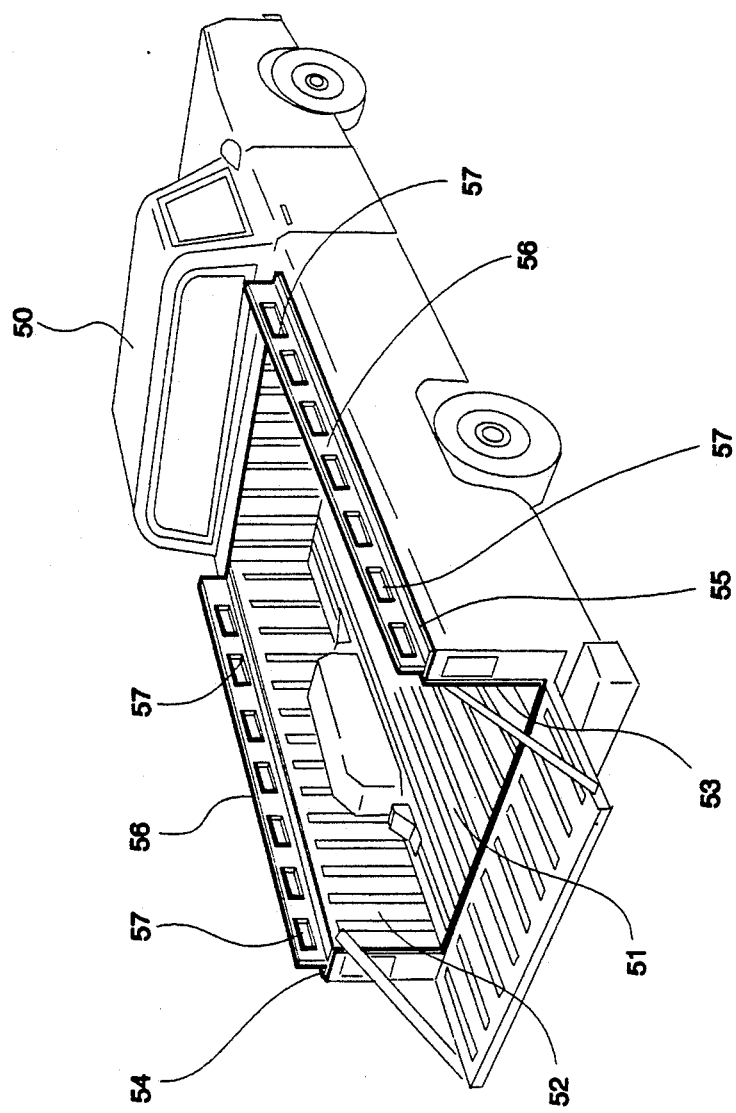
FIG. 10 shows a perspective view of the truck bed liner having an integral rail according to the present invention.

FIG. 10 shows a perspective view of the truck bed liner having an integral rail according to the present invention. Truck 50 has a cargo bed which is covered by a liner. The liner has bottom 51 and side walls 52, 53 which substantially cover the vehicle cargo bed's interior walls. Each liner side wall 52, 53 includes a first portion substantially covering the bed's side wall.

Figure 11:
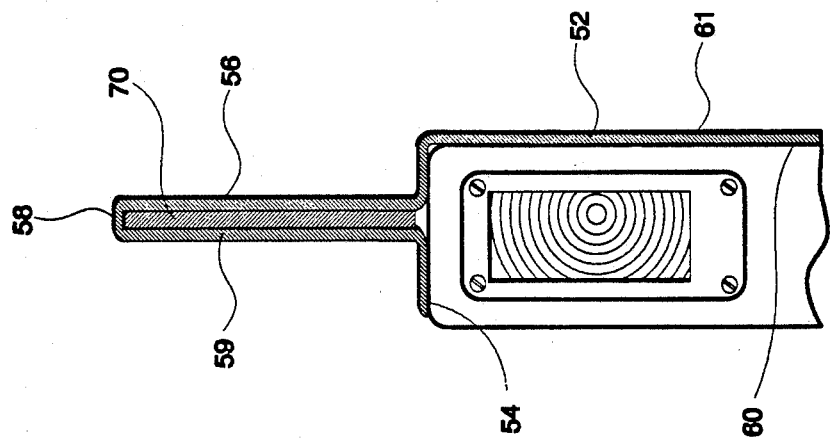
FIG. 11 shows a partial cross-sectional view of one embodiment of the integral rail of the present invention wherein the rail is reinforced.

Referring to FIG. 11, there is shown a partial cross-sectional view of one embodiment of the integral rail of the present invention wherein the rail is reinforced. First liner portion 52 is connected to second liner portion 56 which vertically extends above top surface 54 of the vehicle's side wall. Third liner portion 58 is connected to second liner portion 56 and to fourth liner portion 59 which also vertically extends above top surface 54. Third liner portion 58 extends horizontally from second and fourth liner portions 56, 59. In this embodiment, second, third and fourth liner portions 56, 58 and 59 form in cross-section a U channel inside which reinforcement member 70 resides. Reinforcement member 70 may be made from wood, plastic, metal or other materials which assist in reinforcing second and fourth liner portions 56 and 59. Reinforcement member 70 may also comprise a rod or rods formed within the rail. As shown in FIG. 10, second and fourth liner portions 56, 59 may have one or more apertures 57 therethrough for the attachment of a tie-down. To produce the integral rail with reinforcement member 70 having at least one aperture common and coaxial with apertures 57 of second and fourth liner portions 56, 59, reinforced member 70 is set on the liner mold and formed with liner 11 as discussed previously for the embodiments of FIGS. 1-2 and 4-5. It will be appreciated that apertures 57 are self-sealing if the process described herein is used to form liner 11, thereby reducing the possibility for moisture damage to the cargo bed beneath the rail.

It will be appreciated by those of skill in the art that the integral rail of the present invention does not require special installation as it is "installed" at the same time liner 11 is installed. It will further appreciated that the placement of the rail on top of the side wall of the vehicle cargo bed assist in relieving the stress on the liner experienced when tie-downs are affixed to the rail. Additionally, the provision of a reinforcement member within the rail provides greater support. Also, such a rail may be present above the surface of the liner closest to the truck cab, i.e., the front wall of the cargo bed.

It will also be appreciated that the term "truck" as used herein and in the claims is intended to mean any variety of wheeled vehicle, including vans, automobiles, and the like, and does not require that the vehicle be powered and is therefore applicable to trailers and the like as well. The term "liner for a cargo bed" as used in the claims includes cargo bed liners, toppers or cargo covers formed using the process described herein for the formation of a protrusion from one of the opposing surfaces of the liner.

What is claimed is:

1. A truck bed liner for a vehicle cargo bed having at least one interior surface, comprising:
   a liner capable of substantially covering the interior surface of the vehicle cargo bed,
   the liner comprising a first liner surface for engaging the interior surface of the vehicle cargo bed and a second liner surface opposite the first liner surface; and
   an attachment member having two opposing surfaces, the first opposing surface of the attachment member being embedded in and substantially flush with the first liner surface of the vehicle cargo bed.

2. The truck bed liner of claim 1 wherein the attachment member comprises a washer.

3. The truck bed liner of claim 1 wherein the attachment member comprises a nut.

4. A liner for a cargo bed, comprising:
   a liner having first and second opposing liner surface; and
   an attachment member having two opposing surfaces, the first opposing surface of the attachment member being embedded in and substantially flush with the first liner surface of the cargo bed.

5. A truck bed liner for a vehicle cargo bed having at least one interior surface, comprising:
   a liner capable for substantially covering the interior surface of the vehicle cargo bed,
   the liner comprising a first liner surface for engaging the interior surface of the vehicle cargo bed and a second liner surface opposite the first liner surface; and
   a protrusion extending from the second liner surface and away from the first liner surface, the protrusion being of unitary construction with the liner and formed to define a substantially closed hole adapted to receive an attachment, the hole being spaced from the second liner surface.

6. The truck bed liner of claim 5 further comprising:
   a reinforcement member having a hole therein and positioned within the protrusion such that the hole of the reinforcement member aligns with the hole of the protrusion.

7. The truck bed liner of claim 5 wherein the protrusion is impervious to moisture passing between the first and second opposing surfaces of the liner.

8. A liner for a cargo bed, comprising:
   a liner having a first and second opposing liner surface; and
   a protrusion extending from the second liner surface and away from the first liner surface, the protrusion being of unitary construction with the liner and formed to define a substantially closed hole adapted to receive an attachment means, the hole being spaced from the second liner surface.

9. A truck bed liner for a vehicle cargo bed having at least one interior surface, comprising:
   a liner substantially covering the interior surface of the vehicle cargo bed,
   the liner comprising a first liner surface for engaging the interior surface of the vehicle cargo bed and a second liner surface opposite the first liner surface;
   a protrusion extending from the second liner surface and away from the first liner surface, the protrusion being of unitary construction with the liner, and comprising first and second opposing holes therein; and
   a fastener adapted to receive an attachment means, the fastener comprising first and second opposing ends, the first opposing end being inserted through the first hole of the protrusion and the second end being inserted through the second hole of the protrusion.

10. The truck bed liner of claim 9 wherein the fastener comprises a bolt.

11. The truck bed liner of claim 9 wherein the fastener comprises a rod.

12. The truck bed liner of claim 9 wherein the fastener comprises a clip such that the clip and the protrusion, in combination, form a substantially closed hole.

13. The truck bed liner of claim 9 wherein the protrusion comprises a single portion extending between the first and second holes of the protrusion.

14. The truck bed liner of claim 9 wherein the protrusion comprises a first and second portion such that the first portion of the protrusion has the first hole therein and the second portion of the protrusion has the second hole therein, and such that the fastener substantially extends between the first and second portions of the protrusion.

15. The truck bed liner of claim 9 wherein the protrusion comprises a first and second portion such that the first portion of the protrusion has the first hole therein and the second portion of the protrusion has the second hole therein, such that the first and second portions of the protrusion are substantially between the first and second holes of the protrusion.

16. The truck bed liner of claim 9 wherein the fastener is pivotally movable about an axis defined by the first and second opposing holes of the protrusion.

17. A liner for a cargo bed, comprising:
a liner having first and second opposing liner surface;
a protrusion extending from the second liner surface and away from the first liner surface, the protrusion being of unitary construction with the liner, and comprising first and second opposing holes therein; and
a fastener adapted to receive an attachment means, the fastener comprising first and second opposing ends, the first opposing end being inserted through the first hole of the protrusion and the second end being inserted through the second hole of the protrusion.

18. A truck bed liner for a vehicle cargo bed having at least one substantially vertical interior wall with a top surface, comprising:
a first liner portion capable of substantially covering the vertical interior wall of the vehicle cargo bed;
a second liner portion connected to the first liner portion and vertically extending above the top surface of the vertical interior wall;
a third liner portion connected to the second liner portion and extending horizontally therefrom; and
a fourth liner portion connected to the third liner portion and vertically extending above the top surface of the vertical interior wall,
the first, second, third and fourth liner portions being of unitary construction, and the liner having at least aperture in the second and fourth liner portions.

19. The truck bed liner of claim 18 wherein the second, third and fourth liner portions form in cross-section a U channel, and the truck bed liner further comprises a reinforcement member within the U channel, the reinforcement member having at least on aperture common with the aperture(s) of the second and fourth liner portions.

20. A liner for a cargo bed having a reinforcement member, the liner being formed by the process of:
providing a mold substantially formed to be the shape of the desired liner;
providing a vacuum means through the mold;
providing a formable plastic sheet capable of substantially covering the mold;
providing a reinforcement member;
placing the reinforcement member on the mold in the desired location;
placing the plastic sheet over the mold and the reinforcement member;
heating the plastic sheet; and
applying a vacuum through the mold with the vacuum means to draw the plastic sheet toward the mold to thereby form a liner having a reinforcement member embedded therein.

21. The liner of claim 20 wherein the reinforcement member comprises an attachment member having two opposing surface, the first opposing surface facing away from the mold when placed thereon, such that the first opposing surface of the attachment member is flush with the plastic sheet after the liner is formed.

22. The liner of claim 20 wherein the reinforcement member forms a U channel in the plastic sheet when the vacuum means is applied to the mold.

23. A liner for a cargo bed having a reinforcement member, the liner being formed by the process of:
providing a mold substantially formed to be the shape of the desired liner;
providing a vacuum menas through the mold;
providing a formable plastic sheet capable of substantially covering the mold;
providing a reinforcement member;
providing a means for supporting the reinforcement member;
placing the support means of the mold in the desired location;
placing the reinforcement member in the support means;
placing the plastic sheet over the mold and the reinforcement member;
heating the plastic sheet; and
applying a vacuum through the mold with the vacuum means to draw the plastic sheet toward the mold to thereby form a liner having a protrusion extending away from the mold and having the enforcement member embedded therein.

24. The liner of claim 23 wherein the reinforcement member and the protrusion have a coaxial aperture therein.

* * * * *